Jan. 17, 1950     L. D. DRUGMAND     2,494,747

ARC WELDING SYSTEM

Filed Aug. 9, 1948

Inventor
Lester D. Drugmand
By Frank W. Hubbard
Attorney

Patented Jan. 17, 1950

2,494,747

UNITED STATES PATENT OFFICE 2,494,747

ARC WELDING SYSTEM

Lester D. Drugmand, Greenfield, Wis., assignor to Cutler-Hammer, Inc., Milwaukee, Wis., a corporation of Delaware Application August 9, 1948, Serial No. 43,317

10 Claims. (Cl. 315—273)

The invention relates to an alternating current welding system in which a single unidirectional pulse of current, whose duration does not exceed that of a single half wave of alternating current, is supplied to the welding apparatus. The invention is particularly applicable to resistance welding.

An object of the invention is to provide a welding system of the aforementioned type which is simple in construction and operation.

Another object is to provide in a welding system employing an electron tube for the control of the welding current, means to afford a quantity of ignition energy to the tube which is independent of the moment of ignition.

Another object is to assure but a single pulse of ignition energy for starting the flow of welding current.

Another object is to store up ignition energy derived from an energy source in a capacitor and disconnect said capacitor from said source prior to its discharge for effecting ignition.

Another object is to provide an ignition voltage igniated by a peaking transformer, whereby the peak voltage is applied at a predetermined point of a cycle regardless of the moment of closure of the switch for controlling the initiation of welding energy.

Another object is to provide a system which affords adjustment within wide limits of the welding energy supplied to a weld by controlling the duration of current flow during an adjustable fraction of a single half cycle.

Another object is to provide a novel control system of the aforementioned type which is adapted for use with different types of electronic tubes through which the welding energy is supplied.

Other objects and advantages will hereinafter appear.

Figure 1:
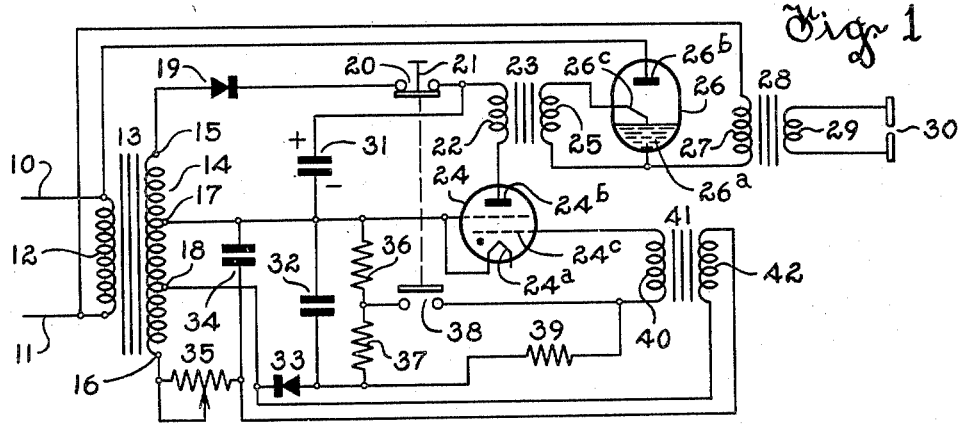

The appended drawings are illustrative of certain embodiments of the invention. In the drawing, Figure 1 is a diagram of connections of a system employing for control of the welding energy, a mercury pool tube having a voltage responsive ignition electrode such as the tube disclosed in the Cox et al. Patent No. 2,445,564, issued July 20, 1948, and assigned to the same assignee as the present application.

Figure 2:
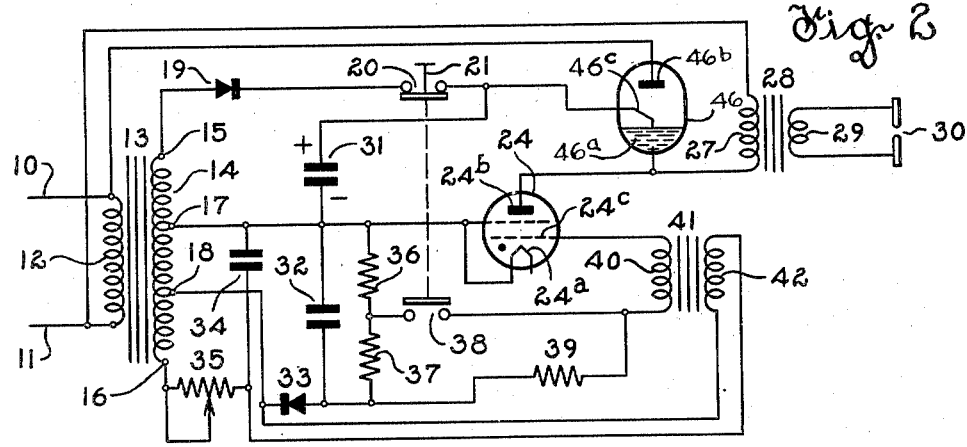
Figure 3:
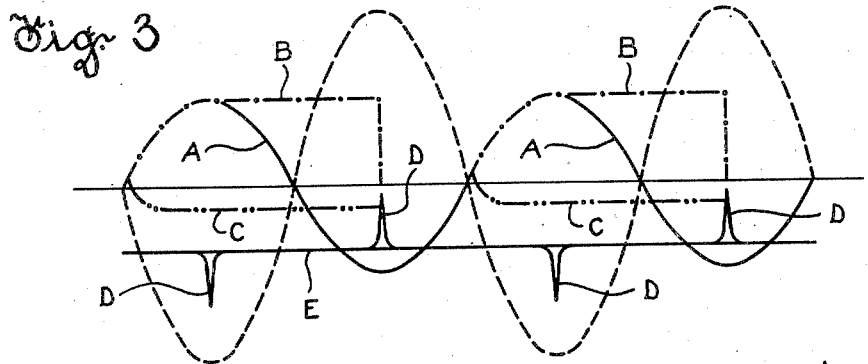

Fig. 2 is a modification of the system illustrated in Fig. 1, for use with a tube for controlling the welding energy which has a current responsive ignition electrode such as the tube generally known as an "Ignitron," while Fig. 3 is a diagram of the voltages obtaining in certain parts of the system.

Referring to Fig. 1, the alternating current supply lines 10 and 11 are connected to the terminals of the primary winding 12 of a transformer 13, which is also equipped with a secondary winding 14, having end terminals 15 and 16, and intermediate terminals 17 and 18. The terminal 15 is connected through a half wave rectifier 19, normally closed contacts 20 of a manual switch 21 and the primary winding 22 of a transformer 23 to the anode 24$^b$ of a gaseous electron tube 24, which also has a cathode 24$^a$, and a control electrode 24$^c$. The transformer 23 is provided with a secondary winding 25 which is connected between the cathode 26$^a$ and the voltage responsive ignition electrode 26$^c$ of a tube 26. The anode 26$^b$ of tube 26 is directly connected to the line 10. The cathode 26$^a$ of the tube 26 is connected in series with the primary winding 27 of a welding transformer 28 to the line 11. The transformer 28 has a secondary winding 29, which is connected across a pair of welding electrodes 30. A capacitor 31 connects the common point of the contacts 20 and the winding 22 with the terminal 17, while capacitor 32 has one of its terminals connected to the terminal 17 and its other terminal in series with a half wave rectifier 33 to the terminal 18. Connected across the terminals 16 and 17 is a phase shifting network comprising the capacitor 34 and in series therewith an adjustable resistor 35. Connected in parallel with the capacitor 32 are two series connected resistors 36 and 37. The common point of the resistors 36 and 37 is connected through a pair of normally open contacts 38 of the switch 21 to one terminal of the secondary winding 40 of a peaking transformer 41. The same terminal of winding 40 is also connected through a resistor 39 to the common point of resistor 37 and capacitor 32. The second terminal of the winding 40 is connected to the control electrode 24$^c$ of tube 24. The transformer 41 has a primary winding 42 which is connected between the terminal 18 and the common terminal of the capacitor 34 and the resistor 35. The operation of the system is as follows:

With the system as shown and the lines 10 and 11 energized, a unidirectional charging current will flow from the secondary winding 14, through the rectifier 19, the capacitor 31, to terminal 17 of the winding 14, and another charging current flows from the terminal 17, through the capacitor 32, the rectifier 33, to the terminal 18. The capacitor 31 is fully charged during the first positive half cycle of the alternating current impressed thereon so that the plate of the capacitor 31, which is connected through the winding 22 to the anode 24b is positive. Hence the tube 24 tends to discharge the capacitor through the winding 22, but conduction of said tube is blocked as will appear hereinafter.

An alternating current flows through the winding 42, whose time-phase relative to the time phase of the alternating line voltage is dependent upon the adjustment of the phase shifting network 34, 35. This current induces a peaked voltage in the winding 49, but as will be later apparent this voltage under the influence of a superposed voltage is not at once effective to render tube 24 conducting. Until the tube 24 does conduct, no current will flow through the winding 22 and therefore no voltage is induced in the winding 25 to initiate conduction of the tube 26. Meanwhile the capacitor 31 is charged to a given maximum voltage and remains charged, while a unidirectional voltage due to the charge of capacitor 32 is superposed upon the peaked voltage induced in the winding 40 of the transformer 41. The resultant potential impressed on the control electrode 24c is of such amplitude with respect to the cathode 24a If the operator now wishes to make a weld he as to block conduction of the tube 24.
operates the switch 21 to open the contacts 20, and close the contacts 38. This changes the unidirectional component of the potential of the control electrode 24c with respect to the cathode 24a by an amount equal to the voltage drop in resistor 37, the adjustment being such that now the resultant of the unidirectional and the peak voltages impressed on the control electrode 24c is sufficient to render the tube 4 conducting at a given moment during the positive half cycle, determined by the adjustment of the phase shift network 34—35. When the tube 24 becomes conducting, the capacitor 31 is rapidly discharged through the tube and the resulting current in the winding 22 induces a voltage in the winding 25, which causes the ignition of the tube 26, thereby completing a circuit across the lines 10—11, through the primary winding 27. This current induces a voltage in the winding 29, which causes a welding current to flow between the welding electrodes 30 to produce the weld. The capacitor 31 and the impedance of its discharge path are so proportioned that the capacitor is substantially discharged in a fraction of a half cycle, hence in the period from the start of conduction of the tube 26, during the first positive half cycle to substantially the end of such half cycle. As aforedescribed the moment of ignition is determined by the adjustment of the phase shifting network and thus the total amount of energy supplied during a single weld may be controlled by such adjustment.

Fig. 2 is a system similar to Fig. 1, except that the tube 26 in Fig. 1, which has a voltage responsive ignition electrode is replaced by a tube 46 which has a current responsive electrode, and the transformer 23 has been omitted. The system Fig. 2 operates in substantially the same manner as that described except that the capacitor 31 discharges over a path from one terminal of the capacitor through the ignition electrode 46c of the tube 46 to the cathode 46a of said tube, to the anode 24b of the tube 24, and then over the path already traced back to the capacitor 31. The functioning of the rest of the system is the same as that described and therefore requires no further elaboration.

Fig. 3 shows the relation of certain voltages which determine the operation of the system. The curve A shows the sinusoidal line voltage which is impressed on the primary winding 27 of transformer 28 when it is energized. It may also represent, but in different scales, the voltage impressed on the main electrodes of tube 24 and on the capacitor 31. When said capacitor is charged its potential is the peak potential of the alternating potential as represented by the horizontal line B. The critical potential of the control electrode of tube 24 is represented by line C, the potential of the secondary winding 40 by the triangular peaks D, and the negative blocking bias of capacitor 32 by the horizontal line E. When the resultant of voltages D and E is less negative than voltage C during the positive half cycle of A, the tube 24 will start conduction as aforedescribed, the moment of starting being adjustable through adjustment of the resistor 35.

It will be apparent that under certain conditions where a relatively low welding current pulse at relatively high voltage is desired the transformer 28 in Figs. 1 and 2 may be omitted, in which case the welding electrodes are connected between the cathode 26a and the line 11.

Other modifications within the scope of the present invention will suggest themselves to those skilled in the art.

What I claim as new and desire to secure by Letters Patent is:

1. In combination, an alternating current source, a capacitor, rectifying means for charging said capacitor with energy from said source and including means affording isolation of said capacitor from said source, a normally non-conducting electron tube having its main electrodes connected to said capacitor and having a control electrode upon which initiation of its conduction is dependent, means deriving energy from said source for supply to said control electrode and limiting to half cycles of given polarity of the voltage of said source, the supply of energy effective to initiate discharge of said capacitor through said tube, the last mentioned means including means to adjust the moment of initiation of conduction of said tube and further including means requiring for initiation of conduction of said tube, isolation of said capacitor from said source, a translating circuit, and energy transmitting means between said source and said translating circuit which is dependent for effectiveness upon discharge of said capacitor and which is self limiting to effectiveness for a single half cycle of voltage of said source.

2. In combination, an alternating current source, a capacitor, rectifying means for charging said capacitor with energy from said source and including means affording isolation of said capacitor from said source, a normally non-conducting electron tube having its main electrodes connected to said capacitor and having a control electrode upon which initiation of its conduction is dependent, means deriving energy from said source for subjecting said control electrode, periodically at a given moment in half cycles of given polarity of the voltage of said source, to a voltage pulse sufficient to initiate conduction of said tube, means subjecting said control electrode to a unidirectional voltage for blocking conduction of said tube, means rendered effective when said capacitor is isolated from said source to modify said unidirectional voltage for permitting said tube to conduct in response to said voltage pulse to thereby effect discharge of said capacitor through said tube, a translating circuit, and energy transmitting means between said source and said translating circuit which is dependent for effectiveness upon discharge of said capacitor and which is self limiting to effectiveness for a single half wave of voltage of said source.

3. In combination, an alternating current source, a translating circuit, a gaseous electron tube in circuit with said source and said translating circuit and having an ignition electrode, a capacitor, rectifying means for charging said capacitor with energy from said source, a normally non-conducting second electron tube having its main electrodes connected to said capacitor and having a control electrode upon which initiation of its conduction is dependent, means deriving energy from said source for supply to said control electrode and limiting to half cycles of given polarity of the voltage of said source, the supply of energy effective to initiate discharge of said capacitor through said second tube, the last mentioned means including means to adjust the moment of initiation of conduction of said tube and further including means requiring for initiation of conduction of said second tube, isolation of said capacitor from said source, said ignition electrode being energized as a function of discharge of said capacitor for rendering the first mentioned tube conducting for the duration of said half cycle of voltage of said source.

4. In combination, an alternating current source, a translating circuit, a gaseous electron tube having main electrodes in circuit with said source and said translating circuit and having an ignition electrode, a capacitor, rectifying means for charging said capacitor with energy from said source and including means affording isolation of said capacitor from said source, a normally non-conducting second electron tube having its main electrodes connected across said capacitor through the ignition electrode and cathode of said first tube and having a control electrode, means deriving energy from said source for subjecting said control electrode, periodically at a given moment in half cycles of given polarity of the voltage of said source, to a voltage pulse sufficient to initiate conduction of said second tube, means subjecting said control electrode to a unidirectional voltage for blocking conduction of said second tube, and means rendered effective when said capacitor is isolated from said source to modify said unidirectional voltage for permitting said second tube to conduct in response to said voltage pulse to thereby effect discharge of said capacitor.

5. In combination, an alternating current source, a translating circuit, a gaseous electron tube having its main electrodes in circuit with said source and said translating circuit and having an ignition electrode, a capacitor, rectifying means for charging said capacitor with energy from said source and including means affording isolation of said capacitor from said source, a transformer having primary and secondary windings, a normally non-conducting second electron tube having its main electrodes connected across said capacitor through the primary winding of said transformer and having a control electrode, said ignition electrode of the first mentioned tube being connected to the cathode thereof through the secondary winding of said transformer, means deriving energy from said source for subjecting said control electrode, periodically at a given moment in a half cycle of given polarity of the voltage of said source, to a voltage pulse sufficient to initiate conduction of said second tube, means subjecting said control electrode to a unidirectional voltage for blocking conduction of said second tube, and means rendered effective when said capacitor is isolated from said source to modify said unidirectional voltage for permitting said second tube to conduct in response to said voltage pulse to thereby effect discharge of said capacitor.

6. In combination, an alternating current source, a capacitor, means to connect said capacitor to said source for charging it with rectified current derived therefrom or alternatively to isolate it from said source, an impedance, an electron tube having its main electrodes connected across said capacitor through said impedance, said tube having also a control electrode, a phase shifting network connected to said source, means to impress a peaked voltage derived from said phase shifting network upon said control electrode tending to render said tube conducting to permit discharge of said capacitor for a limited period only, means to superpose on said peaked voltage a unidirectional voltage derived from said source for rendering said tube nonconducting, and means coordinated with said first mentioned means to modify said unidirectional voltage for permitting said tube to conduct in response to said peaked voltage but only if said capacitor is isolated from said source and to terminate such modification of said unidirectional voltage when said capacitor is reconnected to said source.

7. In combination, an alternating current source, a translating circuit, a gaseous electron tube having main electrodes connected in series with said translating circuit and said source and having an ignition electrode, a capacitor, means to connect said capacitor to said source for charging it with rectified current derived therefrom or alternatively to isolate it from said source, a second electron tube having main electrodes connected across said capacitor through the ignition electrode and the cathode of said first tube, said second tube having also a control electrode, a phase shifting network connected to said source, means to impress a peaked voltage derived from said phase shifting network upon said control electrode of said second tube tending to render said second tube conducting for initiating conduction of said first tube by discharge of said capacitor, means to superpose on said peaked voltage a unidirectional voltage derived from said source to render said second tube non-conducting, and means coordinated with said first mentioned means to modify said unidirectional voltage for permitting said tubes to conduct in response to said peaked voltage, but only if said capacitor is isolated from said source and to terminate such modification of said unidirectional voltage with reconnection of said capacitor to said source.

8. In combination, an alternating current source, a welding transformer, a gaseous electron tube having main electrodes connected in series with the primary winding of said transformer and said source and having an ignition electrode, a capacitor, means to connect said capacitor to said source for charging it with rectified current derived therefrom or alternatively to isolate it from said source, a second electron tube having its main discharge path connected across said capacitor through the ignition electrode and the cathode of said first tube, said second tube having also a control electrode, a phase shifting network connected to said source, means to impress a peaked voltage derived from said phase shifting network upon said control electrode of said second tube tending to render said second tube conducting for discharge of said capacitor to initiate energization of said transformer winding through said first tube, means to superpose on said peaked voltage a unidirectional voltage derived from said source to prevent said second tube from conducting, and means coordinated with said first mentioned means to modify said unidirectional voltage for permitting said second tube to conduct, said last named means preventing said modification unless said capacitor is isolated from said source and terminating said modification with reconnection of said capacitor to said source.

9. In combination, an alternating current source, a welding transformer, a gaseous electron tube having main electrodes connected in series with the primary winding of said transformer and said source and having an ignition electrode, a capacitor, means to connect said capacitor to said source for charging it with rectified current derived therefrom or alternatively to isolate it from said source, a second electron tube having its main discharge path connected across said capacitor through the ignition electrode and the cathode of said first tube, said second tube having also a control electrode, a phase shifting network connected to said source, a peaking transformer having a primary winding connected to said phase shifting network and also having a secondary winding connected between the cathode and the control electrode of said second tube to impress upon the latter a voltage tending to render said second tube conducting for discharge of said capacitor for only a limited period to initiate energization of the primary winding of said welding transformer through said first tube, means to superpose on said peaked voltage a unidirectional voltage derived from said source to prevent said second tube from conducting, and means coordinated with said first mentioned means to modify said unidirectional voltage for permitting said tubes to conduct in response to said peaked voltage, said last mentioned means preventing such modification unless said capacitor is isolated from said source and terminating such modification with reconnection of said capacitor to said source.

10. In combination, an alternating current source, a welding transformer, a gaseous electron tube having main electrodes connected in series with the primary winding of said transformer and said source, and having a voltage responsive ignition electrode, an ignition transformer having a secondary winding connected between said ignition electrode and the cathode of said first tube, a capacitor, means to connect said capacitor to said source for charging it with rectified current derived therefrom or alternatively to isolate it from said source, a second electron tube having its main discharge path connected across said capacitor through the primary winding of said ignition transformer, said second tube having also a control electrode, a phase shifting network connected to said source, a peaking transformer having a primary winding connected to said phase shifting network and also having a secondary winding connected between the cathode and the control electrode of said second tube to impress upon the latter a voltage tending to render said second tube conducting for discharge of said capacitor to initiate energization of the primary winding of said welding transformer through said first tube, means to superpose on said peaked voltage a unidirectional voltage derived from said source to prevent said second tube from conducting, and means coordinated with said first mentioned means to modify said unidirectional voltage for permitting said tubes to conduct in response to said peaked voltage, said last mentioned means preventing such modification unless said capacitor is isolated from said source and terminating such modification with reconnection of said capacitor to said source.

LESTER D. DRUGMAND.

REFERENCES CITED

The following references are of record in the file of this patent:

UNITED STATES PATENTS

| Number | Name | Date |
|---|---|---|
| 2,147,472 | Ulrey | Feb. 14, 1939 |
| 2,162,519 | Smede | June 13, 1939 |
| 2,231,674 | Ludwig | Feb. 11, 1941 |
| 2,270,799 | Gulliksen | Jan. 20, 1942 |
| 2,354,140 | Pearson et al. | July 18, 1944 |
| 2,446,533 | England | Aug. 10, 1948 |

FOREIGN PATENTS

| Number | Country | Date |
|---|---|---|
| 649,358 | Germany | Dec. 7, 1934 |